(12) United States Patent
Berenguer et al.

(10) Patent No.: US 10,843,425 B2
(45) Date of Patent: Nov. 24, 2020

(54) PROCESS FOR PRODUCING TYRES PROVIDED WITH AUXILIARY COMPONENTS FOR VEHICLE WHEELS

(71) Applicant: PIRELLI TYRE S.P.A., Milan (IT)

(72) Inventors: Albert Berenguer, Milan (IT); Luca Castellani, Milan (IT); Riccardo Miceli, Settimo Torinese (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 15/304,500

(22) PCT Filed: Apr. 28, 2015

(86) PCT No.: PCT/IB2015/053089
§ 371 (c)(1),
(2) Date: Oct. 14, 2016

(87) PCT Pub. No.: WO2015/166412
PCT Pub. Date: Nov. 5, 2015

(65) Prior Publication Data
US 2017/0036408 A1    Feb. 9, 2017

(30) Foreign Application Priority Data

Apr. 30, 2014   (IT) .............................. MI2014A0797

(51) Int. Cl.
*B29D 30/00* (2006.01)
*B60C 19/00* (2006.01)
(Continued)

(52) U.S. Cl.
CPC .......... *B29D 30/0061* (2013.01); *B29C 33/64* (2013.01); *B29D 30/0601* (2013.01);
(Continued)

(58) Field of Classification Search
CPC ............ B29D 30/0061; B29D 30/0654; B29D 30/0655; B29C 33/58; B29C 37/0067
See application file for complete search history.

(56) References Cited

U.S. PATENT DOCUMENTS 4,359,340 A    11/1982 Comper et al.
4,451,313 A *   5/1984 Jackson ................. B29D 30/08
                                                   152/525
(Continued)

FOREIGN PATENT DOCUMENTS

DE    10100736    *  7/2002    ............ B29C 35/56
EP    0385919     *  9/1990    ............ B29C 33/64
(Continued)

OTHER PUBLICATIONS

Machine generated English language translation of JP 03-47608 (original document dated Mar. 1991).*
(Continued)

*Primary Examiner* — Joseph S Del Sole
*Assistant Examiner* — Manley L Cummins, IV
(74) *Attorney, Agent, or Firm* — Steinfl + Bruno LLP (57) ABSTRACT

A process for producing tyres with auxiliary components for vehicle wheels is described. The process includes i) covering the external surface of an expandable chamber for tyre vulcanisation and moulding apparatuses with a first substantially cross-linkable polysiloxane composition and ii) covering the radially inner surface of the impermeable elastomeric material layer of the green tyre with a second substantially non-cross-linkable polysiloxane composition. An expandable chamber for tyre vulcanisation and moulding apparatuses and, a process for treating the expandable chamber are also described.

24 Claims, 4 Drawing Sheets (51) Int. Cl.
  *B29C 33/64* (2006.01)
  *B29D 30/06* (2006.01)
  *B29D 30/30* (2006.01)

(52) U.S. Cl.
  CPC ..... *B29D 30/0654* (2013.01); *B29D 30/0685* (2013.01); *B29D 30/30* (2013.01); *B60C 19/002* (2013.01); *B29D 2030/0077* (2013.01); *B29D 2030/0655* (2013.01); *B29D 2030/0659* (2013.01); *B29D 2030/0682* (2013.01); *B29D 2030/0686* (2013.01); *B29K 2995/0002* (2013.01)

(56) References Cited

U.S. PATENT DOCUMENTS

| | | | | |
|---|---|---|---|---|
| 4,613,534 A | * | 9/1986 | Blizzard | C08J 5/12 156/156 |
| 4,715,420 A | * | 12/1987 | Kabe | B60C 9/20 152/557 |
| 4,863,650 A | * | 9/1989 | Kohler | B29C 33/64 264/39 |
| 4,889,677 A | * | 12/1989 | Hashimoto | B29D 30/0662 106/287.1 |
| 6,539,998 B2 | | 4/2003 | Sergel | B29D 30/26 156/416 |
| 6,576,399 B1 | * | 6/2003 | Gries | B41C 1/1016 430/272.1 |
| 7,896,633 B2 | | 3/2011 | Agostini et al. | |
| 8,079,839 B2 | * | 12/2011 | Nemoto | B29C 33/10 264/315 |
| 8,101,279 B2 | * | 1/2012 | Guichard | B29C 33/64 428/447 |
| 8,151,930 B2 | | 4/2012 | Yukawa | |
| 2007/0017619 A1 | * | 1/2007 | Yukawa | B60C 19/002 152/450 |
| 2010/0024935 A1 | * | 2/2010 | Jubran | B05D 5/063 152/151 |
| 2010/0043933 A1 | * | 2/2010 | Breunig | B29C 33/64 152/209.1 |
| 2010/0190950 A1 | * | 7/2010 | Tetsuka | B01D 71/44 528/15 |
| 2011/0308705 A1 | * | 12/2011 | Sandstrom | B29D 30/0061 156/123 |

FOREIGN PATENT DOCUMENTS

| | | | | |
|---|---|---|---|---|
| EP | 1577123 A1 | | 12/2004 | |
| GB | 1122073 | * | 7/1968 | ............. B29C 33/64 |
| GB | 2088898 | * | 6/1982 | ............. C10M 3/44 |
| JP | 03-57608 | * | 3/1991 | ............. B29C 33/58 |
| WO | WO 2013/023174 | * | 2/2013 | ............. C08G 77/00 |
| WO | 2013/111073 A1 | | 8/2013 | |

OTHER PUBLICATIONS

Machine generated English language translation of DE 10100736 (Original document dated Jul. 2002).*
International Search Report and Written Opinion for International Application No. PCT/IB2015/053089 filed Apr. 28, 2015 on behalf of Pirelli Tyre S.P.A, dated Jun. 8, 2015. 8 pages.
http://www.commonchemistry.org/ChemicalDetail.aspx?ref=9004-73-3; American Chemical Society; CAS Registry No. 9004-73-3; Index name Poly[oxy(methylsilylene)]; Retrieved Feb. 6, 2017 (2 pages).
International Preliminary Report on Patentability for International Application No. PCT/IB2015/053089 filed on Apr. 28, 2015 on behalf of Pirelli Tyre S.P.A dated Nov. 1, 2016 5 pages.
Decamethylcyclopentasiloxane, Wikipedia—https://en.wikipedia.org/wiki/decamethylcyclopentasiloxane; Retrieved Apr. 12, 2017 (3 pages).
Octamethylcyclotetrasiloxane, Wikipedia—https://en.wikipedia.org/wiki/Octamethylcyclotetrasiloxane; Retrieved Apr. 12, 2017 (2 pages).
Polysilane, Wikipedia—https://en.wikipedia.org/wiki/Polysilane Retrieved Jul. 13, 2017 (2 pages).
Toluene, Wikipedia—https://en.wikipedia.org/wiki/Toluene; Retrieved Apr. 12, 2017 (2 pages).
Xylene, Wikipedia—https://en.wikipedia.org/wiki/Xylene; Retrieved Apr. 12, 2017 (6 pages).
Tetrachloroethylene, Wikipedia—https://en.wikipedia.org/wiki/Tetrachloroethylene; Retrieved Apr. 12, 2017 (5 pages).
Trichloroethane, Wikipedia—https://en.wikipedia.org/wiki/1,1,1-Trichloroethane; Retrieved Apr. 12, 2017 (4 pages).

* cited by examiner

PROCESS FOR PRODUCING TYRES PROVIDED WITH AUXILIARY COMPONENTS FOR VEHICLE WHEELS

CROSS-REFERENCE TO RELATED APPLICATIONS

The present application is the U.S. national stage of International Patent Application PCT/IB2015/053089 filed on Apr. 28, 2015 which, in turn, claims priority to Italian application MI2014A000797 filed on Apr. 30, 2014.

The present invention relates to a process for producing tyres provided with auxiliary components for vehicle wheels, for example sound absorbent foams for reducing the transmission of the noise of the tyre and/or monitoring devices as temperature and/or pressure sensors, and/or sealing complexes in self-sealing tyres.

STATE OF THE ART

A tyre for vehicle wheels generally comprises a carcass structure comprising at least one carcass ply having respectively opposite terminal flaps engaged with respective annular anchoring structures, integrated in the zones normally identified with the name "beads".

The carcass structure is associated with a belt structure comprising one or more belt layers, situated in radial superimposition with respect to each other and with respect to the carcass structure, having textile or metallic reinforcement cords. In radially outer position with respect to the belt structure, a tread band is applied, it too comprising elastomeric material like other semifinished products forming the tyre.

Respective sidewalls are also applied in axially outer position on the lateral surfaces of the carcass structure, each extended form one of the edges of the tread band up to the respective annular anchoring structure.

In the tyre, the crown portion is identified as a tyre portion where the tread is arranged, axially comprised between the two edges thereof.

In the tyres of "tubeless" type, a layer of impermeable elastomeric material, normally termed "liner", covers the inner surfaces of the tyre.

Following the building of the green tyre, actuated by means of assembly/building of the respective components, a moulding and vulcanisation treatment is executed that is aimed to determine the structural stabilization of the tyre by means of cross-linking of the elastomeric compositions as well as, if required, to impart on the same tyre a desired tread pattern and possible graphic marks at the sidewalls.

For such purpose, according to a type of method for moulding and vulcanising a new green tyre termed "at set pressure", the green tyre is introduced into a mould and pressed against the inner walls of said mould by means of an expandable chamber, also termed vulcanisation chamber.

The expandable chamber is arranged within the tyre itself and has, in proximity to each axial end, at least one circumferential edge carrying appendages of anchorage to respective parts of the mould.

The expansion of the expandable chamber is obtained by means of introduction of a pressurized hot fluid (gas or steam) within the same, so as to bring said expandable chamber in contact with the inner surface of the tyre and compress the latter against the walls of the moulding cavity, with simultaneous transmission of the heat required for cross-linking.

Upon completed vulcanisation, the expandable chamber is depressurized and the mould is open, in order to allow the removal of the tyre and arrange the mould at a new vulcanisation cycle.

Once the tyre is vulcanised, auxiliary components can be applied, making them adhere to the inner surface, such components intended for example for monitoring the operating conditions of the tyre, or for functions of self-sealing or absorption of the noise caused by rolling.

During the moulding and vulcanisation operation, a mutual movement of the external contact surface of the expandable chamber and of the radially inner surface of the impermeable elastomeric material layer of the green tyre can frequently be verified both during the chamber expansion step and during the deflation and removal of the chamber from the tyre after the tyre has been moulded and vulcanised.

During the latter operation, the surface of the expandable chamber tends to remain attached to the radially inner surface of the impermeable elastomeric material layer.

The separation of the two surfaces actuated at end of the vulcanisation cycle can cause local damage of the chamber and involve flaws in the tyre.

The U.S. Pat. No. 7,896,633 describes an expandable chamber for cross-linking rubber products comprising an inner layer and an outer layer, such outer layer comprising a silicone rubber.

The U.S. Pat. No. 4,359,340 describes a lubricant composition for use in the covering of vulcanisation chambers comprising polydimethylsiloxane and silane.

The U.S. Pat. No. 8,101,279 describes lubricant emulsions for use in covering vulcanisation chambers and/or green tyres comprising polysiloxane but that, unlike those described in U.S. Pat. No. 4,359,340, do not emit hydrogen; such emulsions perform lubricant functions or they function as primer and thus facilitate the bonding with the surface of the compound of the chamber, depending on the greater or lesser quantity of non-reactive polysiloxane oil contained therein.

According to that described in the U.S. Pat. No. 8,151,930 (corresponding to EP 1577123 A1) relative to tyres provided with sound absorbent foams, the silicone contained in the lubricant composition present on the radially inner surface of the impermeable elastomeric material layer is a disturbance because it does not allow an optimal adhesion of the auxiliary component. It is therefore necessary, before applying the auxiliary component, to clean the radially inner surface of the impermeable elastomeric material layer— mechanically, by means of manual cleaning, by means of laser, or chemically.

WO2013111073, on behalf of the Applicant, describes a method for installing a monitoring device in a tyre for vehicle wheels.

SUMMARY OF THE INVENTION

The Applicant has confronted to need to obtain tyres carrying auxiliary components adhered to the radially inner surface of the impermeable elastomeric material layer, e.g. sound absorbent foams for reducing the transmission of the noise of the tyre and/or monitoring devices like temperature and/or pressure sensors, and/or sealing complexes in self-sealing tyres.

The Applicant thus had to face contrasting needs:
the need to lubricate the interior of the tyre and/or the expandable vulcanisation chamber for the aforesaid problems of relative sliding and separation of the contact surfaces;
the need to facilitate the adhesion of auxiliary components and/or layers on the radially inner surface of the tyre.

Such auxiliary components are in fact suitably made to firmly adhere to the radially inner surface of the impermeable elastomeric material layer of the tyre, typically by means of gluing, in order to avoid that they can be detached due to the rolling thereof.

In order to facilitate the adhesion of the auxiliary component, it is possible to execute a step of chemical and/or physical/mechanical cleaning of the radially inner surface of the impermeable elastomeric material layer, or liner, before coupling the auxiliary component to the surface itself. The Applicant has however observed that the chemical and/or physical/mechanical cleaning operations for the surfaces of the impermeable elastomeric material layer after vulcanisation can involve damaging the integrity of the surface of the impermeable elastomeric material layer, in addition to increasing the times and costs of production and increasing the risk of introducing polluting substances into the production cycle.

On the other hand, the Applicant has verified that the use of high-adhesion glues directly on the lubricated surface without previous cleaning treatment, apart from the cost and difficulty of use, does not seem to ensure the repeatability and duration of the gluing.

The Applicant has posed the problem of making auxiliary layers and/or components firmly and durably adhere to the radially inner surface of the tyre, at the same time maintaining a high quality of the same tyres.

The Applicant has found that it is possible to solve the aforesaid problem, by combining a treatment of permanent multilayer covering of the expandable chamber used during the moulding and vulcanising of the tyre with a treatment of the radially inner surface of the green tyres transferrable to the chamber in a portion that, on the finished tyre, is not affected by the presence of the auxiliary component.

The present invention therefore refers, according to a first, to a process for producing tyres provided with auxiliary components for vehicle wheels comprising:

a) forming, on a forming drum, a green tyre comprising a carcass structure comprising at least one carcass layer having opposite lateral edges associated with respective bead structures, a pair of sidewalls laterally applied on opposite sides of said carcass structure, an impermeable elastomeric material layer applied at a radially inner position with respect to said carcass structure, b) arranging an expandable vulcanisation chamber; c) conforming, moulding and vulcanising the green tyre in a manner so as to obtain a finished tyre;

d) making an auxiliary component adhere on a first radially inner surface portion of the tyre;

wherein arranging an expandable vulcanisation chamber comprises:

b1) covering the external surface of said expandable vulcanisation chamber with a first substantially cross-linkable polysiloxane composition A comprising A1) at least one reactive polysiloxane oil having OH groups, A2) at least one cross-linking agent comprising at least two functional groups capable of reacting with the reactive polysiloxane oil A1)

b2) cross-linking said first substantially cross-linkable polysiloxane composition A on the expandable chamber;

b3) repeating at least once the aforesaid operations b1) and b2), and in which conforming, moulding and vulcanising the green tyre comprises:

c1) selecting at least one green tyre every n green tyres, where n is an integer less than 60;

c2) covering at least one second portion of the radially inner surface of said impermeable elastomeric material layer of said at least one selected green tyre with a second substantially non-cross-linkable polysiloxane composition B comprising B1) at least one non-reactive polysiloxane oil, in which said second portion on the green tyre corresponds with a portion on the finished tyre substantially not superimposing said first portion.

The Applicant has found that by operating in accordance with the process of the present invention, the adhesion of auxiliary layers and/or components on the radially inner surface of the impermeable elastomeric material layer is strong and durable, the times and costs of production of tyres provided with auxiliary components are reduced, and the quality characteristics of the finished tyre are not deteriorated.

The Applicant has also surprisingly observed that with the process according to the present invention, the number of vulcanisation cycles that can be carried out with a same chamber is considerably increased.

Without being tied to any interpretive theory, the Applicant deems that notwithstanding the incomplete covering of the radially inner surface of the impermeable elastomeric material layer of the green tyre, the multilayer treatment of the expandable chamber facilitates the sliding and relative separation of the expandable chamber and the tyre during and at the end of the vulcanisation process, hence the expandable chamber itself is less subject to twisting and cracking.

The lubrication of one tyre every n tyres to be subjected to moulding and vulcanisation allows transferring the lubricant from the tyre to the chamber and from the chamber to the subsequent tyres, only in the portions not affected by the subsequent adhesion of the auxiliary components. This occurs in a manner so as to cyclically but selectively feed the lubricant between the chamber and tyre, simultaneously preventing an excessive present thereof, and ensuring the possibility to make the auxiliary components adhere without having to carry out cleaning operations.

The Applicant deems it possible that the cross-linked layer of the chamber, that faces the tyre portion not hit with the second composition B, incorporates less free polysiloxane (non-cross-linkable polysiloxane oil) which acts as plasticiser and renders the cross-linked thickness softer, thus causing the separation of the film from the surface of the chamber compound.

The two or more covering/cross-linking treatments carried out on the expandable chamber with the first polysiloxane composition A create a rather thick multilayer film, suitably cross-linked and substantially uniformly distributed on the surface of the expandable chamber. Repeating the treatment seems to improve the degree of cross-linking of the first polysiloxane composition A which therefore tends to remain on the chamber for the entire operative cycle of the chamber itself.

The two or more covering/cross-linking treatments of the chamber with the first polysiloxane composition A would also seem to reduce the deformability of the expandable chamber and would ensure an improved covering of the expandable chamber also in the zone at the beads of the tyre.

According to the Applicant, such zones are particularly critical since in the zone of the chamber in contact with the bead of the tyre, stiffening and abrasion phenomena were encountered due to oxidative phenomena and to the sulfur released by the bead filler compound. Due to the process according to the invention, such phenomena of stiffening and abrasion of the expandable chamber are considerably reduced or eliminated.

In particular, when the lubrication treatment of one tyre every n tyres is carried out, leaving free the crown portion of the impermeable elastomeric material layer of the tyre, the Applicant has observed the absence of cracking in the central section of the chamber corresponding to the crown portion of the tyre. The auxiliary component is preferably made to adhere in such crown zone.

In accordance with one embodiment of the invention, the process for producing tyres for vehicle wheels comprises c2) covering zones of the radially inner surface of the impermeable elastomeric material layer placed at the beads and possibly at the sidewalls and edges and/or beyond the edges of said at least one selected green tyre with a second substantially non-cross-linkable polysiloxane composition B comprising B1) at least one non-reactive polysiloxane oil.

Preferably the process for producing tyres for vehicle wheels comprises c2) covering zones of the radially inner surface of the impermeable elastomeric material layer excluding crown portion.

Preferably the integer n can for example be selected based on the type of tyre to be treated and/or defined at the moment following the inspection carried out on a vulcanised tyre.

With the expression "reactive polysiloxane oil" it is intended a silicone oil or a polysiloxane which in use conditions chemically reacts with at least one other constituent of the composition.

With the commonly used term "silicone", or the more correct term "polysiloxane", inorganic polymers are identified based on a silicone-oxygen chain and organic functional groups R bonded to the silicon atoms.

With the expression "non-reactive polysiloxane oil" it is intended a silicone oil or a polysiloxane which in preparation and use conditions substantially does not chemically react with the constituents of the first and/or second polysiloxane composition.

With the term "solvent", it is intended a component capable for example of dissolving, and/or dispersing, and/or emulsifying, and/or diluting the components of the first and/or second polysiloxane composition.

With the expression "volatile phase", it is intended a phase mainly constituted by solvent, and possibly comprising other volatile components such as reactive and non-reactive polysiloxanes, or degradation and/or cross-linking products.

With the expression "multilayer film" referred to the expandable chamber of the present invention, it is intended a covering obtainable following the application and cross-linking of a first substantially cross-linkable polysiloxane composition A executed at least two times.

The present invention can have at least one of the following preferred characteristics, taken separately or in combination with the others.

The first substantially cross-linkable polysiloxane composition A can be applied to the external surface of the expandable chamber before it is mounted on the vulcaniser or even after said chamber has been mounted on the vulcaniser, before or during the preheating step.

The first substantially cross-linkable polysiloxane composition A and/or the second substantially non-cross-linkable polysiloxane composition B can be applied by means of a sponge, by spraying or spreading or by means of other suitable systems.

Preferably the operations b1) and b2) are carried out at least three times. Preferably the covering of the external surface of said expandable vulcanisation chamber is carried out on 100% of the external surface of the chamber.

Preferably after b1), the process comprises b11) removing at least one volatile phase of said first substantially cross-linkable polysiloxane composition A. More preferably, the expandable chamber is preferably left to dry at ambient temperature.

Preferably b2) can be carried out via heating or at ambient temperature possibly in the presence of a cross-linking catalyst. Preferably the cross-linking occurs via heating at a temperature of at least 120° C., preferably at a temperature not greater than 180° C.; more preferably the cross-linking occurs via heating at a temperature comprised between 150° C. and 170° C. for a time comprised between 30 minutes and 2 hours; still more preferably at a temperature comprised between 155° C. and 165° C. for a time comprised between 30 minutes and 90 minutes.

Preferably, at the end of the cross-linking the expandable chamber is cooled, preferably at ambient temperature (at about 20-25° C.).

Preferably, the expandable chamber is cooled for a time that can vary between 1 hour and 24 hours.

Preferably for every single layer of the multilayer film of the expandable chamber, at least 10 g/m$^2$, preferably not more than 50 g/m$^2$ of first substantially cross-linkable polysiloxane composition A are applied, still more preferably between about 14 g/m$^2$ and about 42 g/m$^2$ of first substantially cross-linkable polysiloxane composition A are applied, said composition also comprising the solvent in a quantity equal to at least 50% by weight, preferably to at least 60% by weight, more preferably to at least 75% by weight with respect to the total weight of the composition itself.

Preferably for every single layer of the expandable chamber, the application of said first substantially cross-linkable polysiloxane composition A and/or the removal of said at least one volatile phase of said first polysiloxane composition A are carried out in a manner such that after cross-linking, the remaining thickness of every single layer of the multilayer film of the expandable chamber is at least 3 micrometres, preferably less than 14 micrometres.

Preferably the application of said first substantially cross-linkable polysiloxane composition A and/or the removal of said at least one volatile phase of said first polysiloxane composition A are carried out in a manner such that after cross-linking at the end of the treatment of the expandable vulcanisation chamber, the total remaining thickness of the multilayer film of the expandable chamber is greater than 6 micrometres, preferably less than 50 micrometres, still more preferably comprised between 9 micrometres and 40 micrometres.

The Applicant deems that thicknesses and/or quantities of cross-linked composition that are too low may not be sufficient for isolating the surface of the chamber and for increasing the number of vulcanisation cycles that can be carried out.

The Applicant also deems that the deposition of a high thickness and/or a high quantity of first substantially cross-linkable polysiloxane composition A does not allow a correct cross-linking through the entire thickness of the covering, with consequent risk of delamination and/or separation of the layer.

Preferably the multilayer film of the expandable vulcanisation chamber comprises at least two, preferably at least three, layers of cross-linked polysiloxane composition radially superimposed on each other and on the expandable chamber.

Preferably the multilayer film of the expandable vulcanisation chamber is obtained by subjecting the chamber to at least two, preferably at least three, consecutive treatments of covering with the first substantially cross-linkable polysiloxane composition A and cross-linking of the same on the chamber before said chamber is mounted in the vulcanisation apparatus or before the start of a vulcanisation cycle.

Preferably said first substantially cross-linkable polysiloxane composition A comprises:
A3) at least one non-reactive polysiloxane oil.

Preferably, the weight ratio between the non-reactive oil A3) and the reactive polysiloxane oil A1) is less than 1, preferably it is comprised between 0.01 and 0.7.

Preferably said first substantially cross-linkable polysiloxane composition A comprises:
A4) a cross-linking catalyst.

Preferably said first substantially cross-linkable polysiloxane composition A comprises:
A5) at least one polysiloxane resin having condensable hydroxyl groups and siloxylic units.

The Applicant deems that including a polysiloxane resin A5) in the first substantially cross-linkable polysiloxane composition A allows three-dimensionally bonding the polysiloxane chains in a solid coherent film and forming bonds between the polysiloxane composition and the surface of the expandable chamber.

Preferably said first substantially cross-linkable polysiloxane composition A comprises A6) at least one solvent.

Preferably in the first substantially cross-linkable polysiloxane composition A, the organic substituents bonded to the silicon atom of the reactive polysiloxane oil A1) are selected independently from among linear or branched $C_1$-$C_8$ alkyl, $C_3$-$C_8$ cycloalkyl, linear or branched $C_2$-$C_8$ alkenyl, $C_5$-$C_8$ cycloalkenyl, optionally substituted by hydroxyl, and/or amino optionally substituted with alkyl, alkenyl or cycloalkyl, and/or halogen, and/or cyano.

In the first substantially cross-linkable polysiloxane composition A, preferably the organic substituents bonded to the silicon atom of the reactive polysiloxane oil A1) are independently linear or branched $C_1$-$C_8$ alkyl.

In the first substantially cross-linkable polysiloxane composition A, preferably the molecular weight of the reactive polysiloxane oil A1) is greater than 590 Dalton, more preferably it is greater than 1000 Dalton.

In the first substantially cross-linkable polysiloxane composition A, the cross-linking agent A2) is preferably an organotrialkoxysilane, an organotriacyloxysilane, an organotrioxymosilane or a tetraalkyl silicate; more preferably such cross-linking agent A2) is methyltrimethoxysilane, methyltriethoxysilane, ethyltriethoxysilane or vinyltrimethoxysilane, still more preferably it is methyltriethoxysilane.

The first substantially cross-linkable polysiloxane composition A can contain a second cross-linking agent A2) having functional groups Si—H, for example methyl-hydrogen-silane, dimethyl-hydrogen-silane and polymethyl-hydrogen-silane.

Preferably the first substantially cross-linkable polysiloxane composition A comprises:
at least two different cross-linking agents A2) comprising at least two functional groups capable of reacting with the reactive polysiloxane oil A1); still more preferably said cross-linking different agents A2) are methyltriethoxysilane and polymethyl-hydrogen-silane.

Preferably, in the first substantially cross-linkable polysiloxane composition A, the organic substituents bonded to the silicon atom of the non-reactive polysiloxane oil A3) are selected independently from among linear or branched $C_1$-$C_8$ alkyl, $C_3$-$C_8$ cycloalkyl, linear or branched $C_2$-$C_8$ alkenyl, $C_6$-$C_{10}$ aryl, $C_6$-$C_{15}$ alkylarylene and $C_6$-$C_{15}$ arylalkylene, more preferably from among alkyl $C_1$-$C_8$, $C_6$-$C_{15}$ alkylarylene and $C_6$-$C_{15}$ arylalkylene.

In the first substantially cross-linkable polysiloxane composition A, preferably the molecular weight of the non-reactive polysiloxane oil A3) is greater than 590 Dalton, preferably it is greater than 1000 Dalton.

Preferably the cross-linking catalyst A4) is an organometallic compound, more preferably an organometallic compound of titanium, zirconium or tin, more preferably of tin (Sn), still more preferably such catalyst is octyl tin diacetate, octyl tin dihexanoate or octyl tin dilaurate.

Preferably the organic substituents of the resin A5) are independently linear or branched $C_1$-$C_6$ alkyl, linear or branched $C_2$-$C_8$ alkenyl, $C_3$-$C_8$ cycloalkyl and $C_6$-$C_8$ cycloalkenyl, optionally substituted with a group selected from among —OR', —O—CO—R', an amino group, an amidic group, an epoxy group and a ureido group, where R' is selected from among non-substituted linear or branched $C_1$-$C_6$ alkyl, linear or branched $C_2$-$C_8$ alkenyl, $C_3$-$C_8$ cycloalkyl and $C_5$-$C_8$ cycloalkenyl.

Preferably the solvent A6) is a cyclic polysiloxane, having preferably a molecular weight less than 1000 Dalton, more preferably less than 590 Dalton.

The volatile phase of the first substantially cross-linkable polysiloxane composition A can represent a percentage by weight with respect to the total of at least 50%, preferably at least 60%, more preferably at least 70%, still more preferably at least 75%.

Preferably the first substantially cross-linkable polysiloxane composition A does not contain non-reactive polysiloxane oil A3) or it contains a quantity thereof of less than 5%, more preferably less than 2% by weight with respect to the total.

Optionally, in b1) polysiloxane compositions can be used such as the primer compositions described in U.S. Pat. No. 8,101,279 as first covering of the expandable chamber in order to ensure an improved adhesion to the surface of the chamber compound, in addition to the treatment steps of the process of the present invention.

Preferably both the first substantially cross-linkable polysiloxane composition A and the second substantially non-cross-linkable polysiloxane composition B have a sufficiently low viscosity such that they can be respectively applied on the surface of the expandable chamber and on the radially inner surface of the impermeable elastomeric material layer of the green tyre in a uniform manner by means of a sponge, by spraying or spreading or other suitable systems. In order to do this, such compositions contain components with low viscosity or they are dispersed in a solvent or an aqueous emulsion is obtained, preferably the aqueous emulsion contains about 75% water. The volatile phase is preferably eliminated by means of heat treatment in an oven in the case of the first substantially cross-linkable polysiloxane composition A and at ambient temperature in the case of the second substantially non-cross-linkable polysiloxane composition B.

Preferably the first substantially cross-linkable polysiloxane composition A has a viscosity comprised between 50 centipoise (Cp) and 2000 Cp, more preferably comprised between 75 Cp and 1800 Cp at 21° C.

Preferably the second substantially non-cross-linkable polysiloxane composition B has a viscosity comprised between 50 Cp and 2500 Cp, more preferably comprised between 500 Cp and 1900 Cp.

The viscosity is intended to be measured by means of Brookfield LVT Spindle 2 at 60 RPM at 21° C.

Preferably the first substantially cross-linkable polysiloxane composition A has a solid residue (non-volatile step determined by means of TGA up to 160° C.) comprised between 15% and 45%, more preferably comprised between about 20% and 40%.

Preferably the second substantially non-cross-linkable polysiloxane composition B has a solid residue, as defined above, comprised between 15% and 35%.

Preferably c2) covering predefined portions of the radially inner surface of the impermeable elastomeric material layer of said at least one selected green tyre with a second substantially non-cross-linkable polysiloxane composition B is carried out in the zones situated at the beads, more preferably also at the zones situated at the sidewalls, still more preferably also at the zones situated at the edges of the tyre and/or beyond the edges at part of the crown portion of the tyre, in any case leaving the zone where the auxiliary component will be made to adhere free of treatment.

Preferably c2) is carried out in a manner so as to leave uncovered at least 80%, more preferably 100% of the radially inner surface of the impermeable elastomeric material layer at the crown portion of the green tyre.

Preferably c2) is carried out on one green tyre every n tyres of the production cycle, n being an integer equal to or less than 60, preferably comprised between 5 and 50, more preferably it occurs with a frequency not less than 1 green tyre every 24 (n=24), still more preferably with a frequency not less than 1 green tyre every 12 (n=12), still more preferably with a frequency not less than 1 green tyre every 6 (n=6).

The covering of the tyre can be applied to all the green tyres, in this case the covering is considered with a frequency of 1 green tyre every tyre (n=1).

Preferably between 1 g/m$^2$ and 15 g/m$^2$, more preferably between 4 g/m$^2$ and 12 g/m$^2$ of second substantially non-cross-linkable polysiloxane composition B are applied per single green tyre, said composition also comprising the solvent in a quantity equal to at least 50% by weight, preferably to at least 60% by weight, more preferably to at least 75% by weight with respect to the total weight of the composition itself.

Polysiloxanes, in particular dimethylpolysiloxane have low surface energy and great flexibility in the chain, which render them suitable for being employed in lubricating and anti-adherent formulations.

According to the Applicant, covering predefined portions of the radially inner surface of the impermeable elastomeric material layer optimizes the transfer of the lubricant from the treated tyre to the expandable chamber and in subsequent vulcanisations from the chamber to the tyres, without polluting the radially inner surfaces of the tyre intended for the adhesion of the auxiliary components.

The Applicant has observed that it is possible to obtained, in addition to the transfer of the lubricant, also a partial regeneration of one or more layers of the multilayer film on the expandable chamber, by using a second substantially non-cross-linkable polysiloxane composition B comprising:

B1) at least one non-reactive polysiloxane oil,
B2) at least one reactive polysiloxane oil having OH groups.

Preferably said second polysiloxane composition B comprises:

B3) at least one cross-linking agent comprising at least two functional groups capable of reacting with the reactive polysiloxane oil B2);

Preferably the weight ratio between the non-reactive polysiloxane oil B3) and the reactive polysiloxane oil B2), is at least 1, preferably comprised between 1.5 and 10.

Preferably said second substantially non-cross-linkable polysiloxane composition B comprises:

B4) a cross-linking catalyst.

Preferably said second substantially non-cross-linkable polysiloxane composition B comprises:

B5) at least one polysiloxane resin having condensable hydroxyl groups and siloxylic units.

Preferably said second substantially non-cross-linkable polysiloxane composition B comprises:

B6) at least one solvent.

In the second substantially non-cross-linkable polysiloxane composition B, the organic substituents bonded to the silicon atom of the non-reactive polysiloxane oil B1) are selected independently from among linear or branched $C_1$-$C_6$ alkyl, $C_3$-$C_8$ cycloalkyl, linear or branched $C_2$-$C_8$ alkenyl, $C_6$-$C_{10}$ aryl, $C_6$-$C_{15}$ alkylarylene and $C_6$-$C_{15}$ arylalkylene, more preferably from among alkyl $C_1$-$C_6$, $C_6$-$C_{15}$ alkylarylene and $C_6$-$C_{15}$ arylalkylene.

In the second substantially non-cross-linkable polysiloxane composition B, preferably the molecular weight of the non-reactive polysiloxane oil B1 is greater than 590 Dalton, preferably it is greater than 1000 Dalton.

Preferably in the second substantially non-cross-linkable polysiloxane composition B, the organic substituents bonded to the silicon atom of the reactive oil B2) are selected independently from among linear or branched $C_1$-$C_6$ alkyl, $C_3$-$C_8$ cycloalkyl, linear or branched $C_2$-$C_8$ alkenyl, $C_6$-$C_8$ cycloalkenyl, optionally substituted by hydroxyl, and/or amino optionally substituted with alkyl, alkenyl or cycloalkyl, and/or halogen, and/or cyano, still more preferably, they are independently linear or branched $C_1$-$C_6$ alkyl.

In the second substantially non-cross-linkable polysiloxane composition B, preferably the molecular weight of the reactive polysiloxane oil B2) is greater than 590 Dalton, preferably it is greater than 1000 Dalton.

In the second substantially non-cross-linkable polysiloxane composition B, the cross-linking agent B3) is preferably as defined for the first substantially cross-linkable polysiloxane composition A A2).

Preferably, the second substantially non-cross-linkable polysiloxane composition B contains a second cross-linking agent B3) having functional groups Si—H, for example methyl-hydrogen-silane, dimethyl-hydrogen-silane and polymethyl-hydrogen-silane.

In the second substantially non-cross-linkable polysiloxane composition B, the condensation catalyst B4) is as defined for the first substantially cross-linkable polysiloxane composition A A4).

In the second substantially non-cross-linkable polysiloxane composition B, the organic substituents of the resin B5) are as defined in the first substantially cross-linkable polysiloxane composition A A5).

In the second substantially non-cross-linkable polysiloxane composition B, the solvent B6) is preferably water.

Preferably the volatile phase of the second substantially non-cross-linkable polysiloxane composition B is constituted by water.

Preferably the second substantially non-cross-linkable polysiloxane composition B contains non-reactive polysiloxane oil B1) in a quantity greater than 10%, more preferably greater than 50% by weight with respect to the total composition.

Preferably in step d), the auxiliary component is a sound absorbent foam for reducing the transmission of the noise of the tyre and/or a monitoring device and/or a sealing complex.

DESCRIPTION OF THE DRAWINGS

Further characteristics and advantages will be clearer from the detailed description of a preferred but not exclusive embodiment, of an apparatus for moulding and vulcanising tyres for vehicle wheels, according to the present invention.

Such description is set forth herein below with reference to the enclosed drawings, provided only as a non-limiting example in which.

Figure 1:
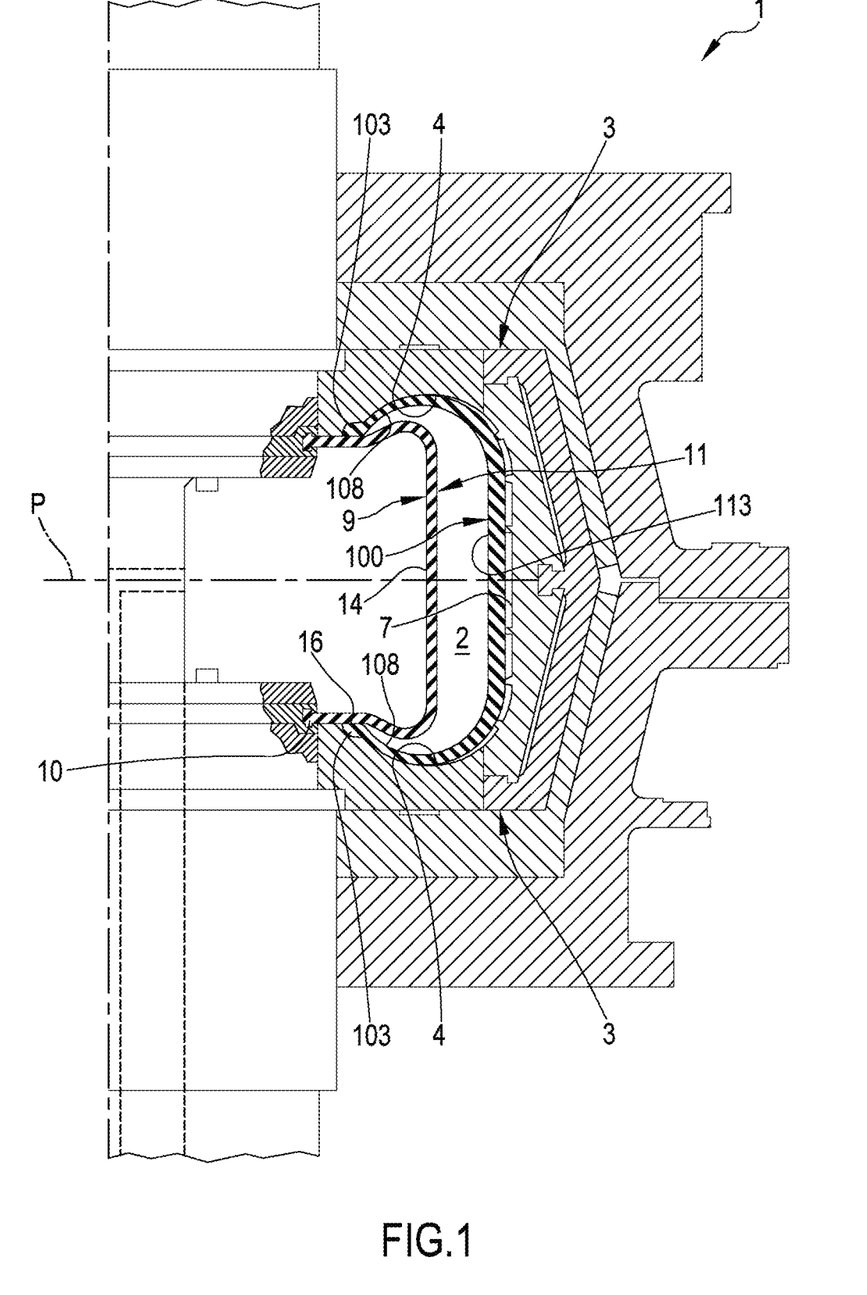
FIG. 1 schematically shows, in diametric section, a vulcanisation mould in an initial step of a moulding and vulcanising process.

With reference to FIG. 1, reference number 1 overall indicates a vulcanisation mould belonging to a tyre building plant.

The vulcanisation and moulding process is executed by introducing the green tyre 100, covered according to the process of the present invention, within a moulding cavity 2 of the vulcanisation mould 1, said cavity 2 having a shape corresponding to the external shaping to be conferred to the tyre 100 once moulded and vulcanised.

The green tyre 100, once shut in the mould 1, is pressed against the containment walls that have suitable reliefs for determining the formation of a specific tread design.

Subsequently or at the same time as the pressing step, heat is administered to the green tyre 1 in a manner so as to determine the cross-linking of the elastomeric material constituting the tyre itself.

As is visible in FIG. 1, the mould 1 has a pair of axially opposite shells 3 that can be mutually coupled at an equatorial plane P. Each of the shells 3 comprises a work surface 4 arranged to operate on beads 103 and on sidewalls 108 of the green tyre 1.

The mutually adjacent shells 3 on the abovementioned equatorial plane P also define a circumferential surface 7 arranged to operate against the tread band of the green tyre 100 to be vulcanised.

The green tyre 100, once shut in the mould 1, is pressed against the containment walls due to an expandable vulcanisation chamber 9.

The expandable chamber for tyre vulcanisation and moulding apparatuses comprises at least one cross-linkable rubber selected from among natural or synthetic rubbers, for example isoprene rubbers. Preferably said expandable chambers comprise a compound with butyl rubber base. Butyl rubber is a copolymer mainly constituted by isobutylene with small quantities of diene monomers, with the purpose of providing sufficient unsaturation for allowing the butyl rubber to cross-link. Preferably, butyl rubber is selected from among isobutyl rubbers; preferably such isobutyl rubbers are selected from among isoolefin monomer homopolymers containing from 4 to 12 carbon atoms, or copolymers obtained by polymerizing a mixture comprising at least one isoolefin monomer containing from 4 to 12 carbon atoms and at least one conjugated diolefin monomer containing from 4 to 12 carbon atoms. Preferably said isoolefin monomer is selected from among compounds $C_4$-$C_{12}$, such as isobutylene, isobutene, 2-methyl-1-butene, 3-methyl-1-butene, 2-methyl-2-butene, methyl vinyl ether, indene, vinyltrimethylsilane, hexene, 4-methyl-1-pentene, or mixtures thereof. Isobutylene is preferred.

Preferably, said conjugated diolefin monomer is selected from among the compounds from $C_4$ to $C_{14}$, such as isoprene, 1,3-butadiene, 2,3-dimethyl-1,3-butadiene, myrcene, 6,6-dimethyl-fulvene, hexadiene, cyclopentadiene, piperylene, or mixtures thereof. Isoprene is preferred.

Other polymerizable monomer, such as styrene, styrene optionally substituted with $C_1$-$C_4$-alkyl or halogen groups, such as methylstyrene, dichlorostyrene, can be present in the abovementioned butyl rubbers.

More preferably, the butyl rubbers are selected from among halogenated and nitrilated butyl rubbers. Still more preferably the butyl rubbers are selected from among halogenated isobutylene and p-alkylstyrene copolymers. Preferably said halogenated isobutylene and p-alkylstyrene copolymers are selected from among copolymers of an olefin containing from 4 to 7 carbon atoms, such as isobutylene, and with a p-alkylstyrene such as for example p-methylstyrene.

Optionally, said butyl rubber base compound contains conventional additives, including fillers, peptizing agents, stearic acid, accelerators, vulcanising sulfur agents, resins for cross-linking, antiozonants, antioxidants, process oils, activators, initiators, plasticisers, waxes, prevulcanisation inhibitors, diluent oils and the like.

The expandable vulcanisation chamber 9, covered according to the process of the present invention, has substantially toroidal shape.

The expandable chamber 9 is subjected to a treatment comprising at least two, preferably at least three successive cycles for covering with the above-described first substantially cross-linkable polysiloxane composition A and subsequent cross-linking of the same in a manner so as to obtain a multilayer film constituted by at least two, preferably at least three layers with cross-linked polysiloxane composition.

The expandable vulcanization chamber 9 has two circumferential radially inner edges carrying respective anchoring appendages 10, sealingly engageable in the mould 1, for operatively associating the expandable chamber 9 with the same mould The anchorage appendages 10 are connected to the mould 1 at more internal anchorage zones of the surfaces of the shells 3 that receive the beads of the green tyre 100.

A supply duct for vapour, or another operative fluid, obtained in the mould 1 flows inside the expandable chamber 9, so as to allow the expansion of the latter following the introduction of pressurised vapour, in order to compress the green tyre 100 against the containment walls of the mould 1.

Such compression preferably occurs in a manner such that the radially outer surface 11 of the expandable chamber 9 approaches and contacts the radially inner surface 112 of the green tyre 100, according to a specific approach sequence.

Preferably, on the inner surface 14 of the expandable chamber 9, a first plurality of grooves 16 is obtained on at least one portion of said expandable chamber 9.

Preferably said first plurality of grooves 16 is obtained according to trajectories that are substantially parallel to each other.

The lubricant of one tyre every n tyres to subject to moulding and vulcanisation is selectively carried out only in the portions not affected by the subsequent adhesion of the auxiliary components.

Preferably the auxiliary component is fixed to the impermeable elastomeric material layer in the crown portion, axially occupying different crown portions which can engage relatively small surfaces, of a few cm$^2$, such as in the case monitoring devices, or the entire crown portion and possibly also the sidewalls as in the case for example of a sealing complex. Consequently, the covering of the second portions of the radially inner surface 113 of the impermeable elastomeric material layer of said at least one selected green tyre with a second substantially non-cross-linkable polysiloxane composition B is carried out in a manner so as to not cover the radially inner surface of the impermeable elastomeric material layer corresponding to part or all of the crown portion.

Preferably the covering is carried out in the zones situated at the beads, more preferably also at the zones situated at the sidewalls, still more preferably also at the zones situated at the edges of the tyre and/or beyond the edges at part of the crown portion of the tyre, in any case leaving free of treatment the portion of impermeable elastomeric material layer on which, in the finished tyre, the auxiliary component is made to adhere.

Figure 2:
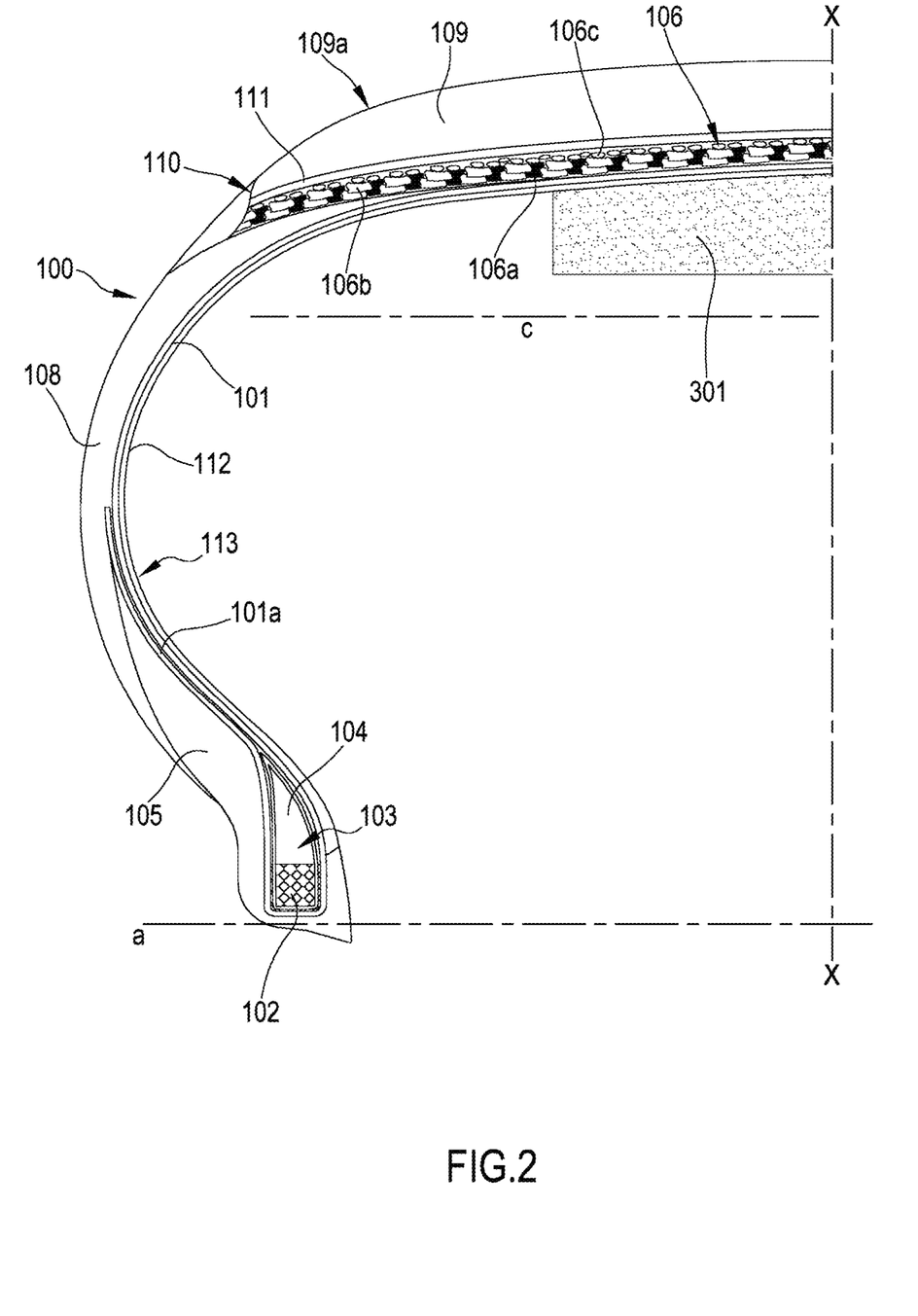
FIG. 2 schematically shows, in radial half-section, a tyre for vehicle wheels.

At the end of the moulding and vulcanisation process, a finished tyre is obtained like that shown in the radial half-section of FIG. 2.

In FIG. 2, "a" indicates an axial direction and "X" indicates a radial direction, in particular with X-X the line of the equatorial plane is indicated.

The tyre 100 for four-wheel vehicles comprises at least one carcass structure, comprising at least one carcass layer 101 having respectively opposite terminal flaps engaged with respective annular anchoring structures 102, termed bead cores, possibly associated with a bead filler 104. The zone of the tyre comprising the bead core 102 and the filler 104 forms a bead structure 103 intended for the anchorage of the tyre on a corresponding mounting rim, not illustrated.

The carcass structure is usually of radial type, i.e. the reinforcement elements of the at least one carcass layer 101 are found on planes comprising the rotation axis of the tyre and substantially perpendicular to the equatorial plane of the tyre. Said reinforcement elements are generally constituted by textile cords, for example rayon, nylon, polyesters (e.g. polyethylene naphthalate (PEN)). Each bead structure is associated with the carcass structure by means of bending backward the opposite lateral edges of the at least one carcass layer 101 around the annular anchoring structure 102 in a manner so as to form the so-called turn-ups of the carcass 101*a* as illustrated in FIG. 2.

In one embodiment, the coupling between the carcass structure and the bead structure can be provided by means of a second carcass layer (not represented in FIG. 2) applied at an axially outer position with respect to the first carcass layer.

An anti-abrasive layer 105 made with elastomeric material is arranged at an external position of each bead structure 103.

The carcass structure is associated with a belt structure 106 comprising one or more belt layers 106*a*, 106*b* situated in radial superimposition with respect to each other and with respect to the carcass layer, typically having textile and/or metallic reinforcement cords incorporated within a layer of elastomeric composition.

Such reinforcement cords can have crossed orientation with respect to a circumferential extension direction of the tyre 100. By "circumferential" direction it is intended a direction generically directed according to the tyre rotation direction.

In radially more external position with respect to the belt layers 106*a*, 106*b*, at least one circumferential reinforcement layer 106*c* is applied, commonly known as "belt 0°", comprising at least one circumferential belt layer.

The (circumferential belt) reinforcement layer can typically comprise a plurality of textile and/or metallic reinforcement cords.

In radially outer position with respect to the belt structure 106, a tread band 109 made of elastomeric compound is applied, like other semifinished products forming the tyre 100.

Respective sidewalls 108 made of elastomeric compound are also applied in axially outer position on the lateral surfaces of the carcass structure, each extended from one of the lateral edges 110 of the tread 109 up to the respective bead structure 103. The tyre portion comprised between the edges 110 identifies the crown C of the tyre. The belt structure 106 is preferably extended at such crown C, hence up to the edges 110 in radially inner position with respect to the tread.

In radially outer position, the tread band 109 has a rolling surface 109*a* intended to come into contact with the ground. Circumferential grooves, which are connected by transverse notches (not represented in FIG. 2) in a manner so as to define a plurality of blocks of various shapes and sizes distributed on the rolling surface 109*a*, are generally obtained in this surface 109*a*, which for the sake of simplicity is represented smooth in FIG. 2.

An underlayer 111 can be arranged between the belt structure 106 and the tread band 109.

An impermeable layer of elastomeric material 112, generally known as "liner", provides the necessary impermeability to the tyre inflation air, and is typically arranged in a radially inner position with respect to the carcass layer 101.

At least one auxiliary component can be adhered to the radially inner surface 113 of the impermeable elastomeric material layer 112, e.g. by means of gluing, for example between a sound absorbent layer comprising a polymer foam for reducing the transmission of the noise of the tyre and/or a monitoring device such as a temperature and/or pressure sensor, and/or a sealing complex.

The additional component can be made to adhere to the radially inner surface 113 of the impermeable elastomeric material layer by means of gluing with suitable adhesives such as an acrylic adhesive, or by exploiting the adhesive characteristics of the material itself as in the case of the sealing material.

With reference to FIG. 2, a tyre 100 is shown in radial section bearing, as first auxiliary component embodiment, a sound absorbent layer 301, for example made of expanded polymer material or polymer foam. The sound absorbent layer 301 is made integral with the radially inner surface 113 of the impermeable elastomeric material layer 112 in the crown portion C by means of gluing, occupying in axial extension a part of said crown portion previously not covered by the covering made with the second substantially non-cross-linkable polysiloxane composition B, since not covered directly or by means of transfer of said second composition from the expandable chamber to the tyres vulcanized after the treated tyre.

Figure 3:
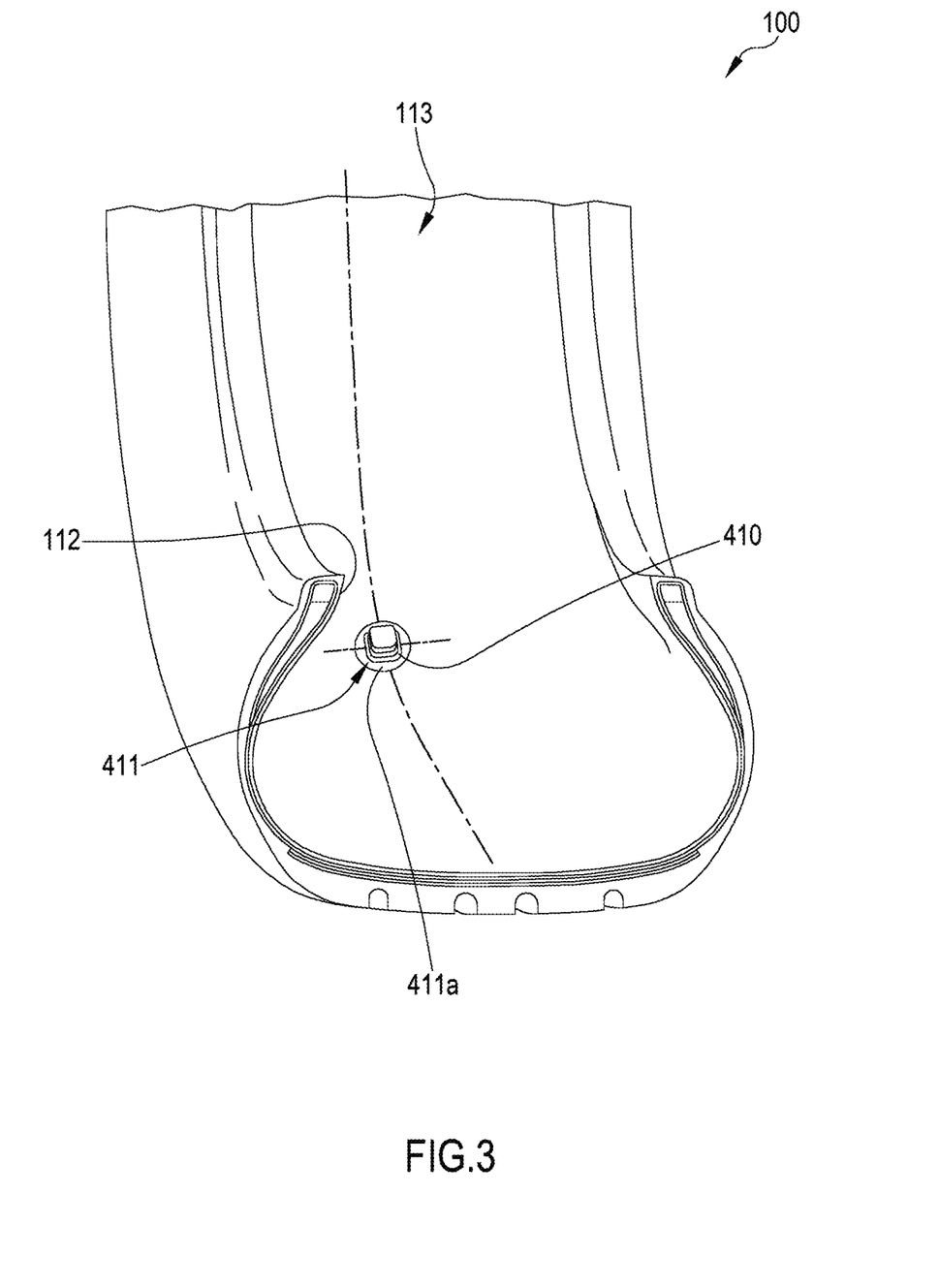
FIGS. 3 and 4 show tyres carrying different auxiliary components.

FIG. 3 shows a perspective view of a tyre bearing, as second auxiliary component embodiment, a monitoring device 410 adhered to the radially inner surface 113 of the impermeable elastomeric material layer in zone of the crown portion C.

The monitoring device 410 comprises a housing 411 bearing one or more electronic devices, such as a temperature and/or pressure sensor, or an accelerometer or inertial sensor.

The housing 411 is provided with a base 411a intended for fixing to the liner of the tyre e.g. by means of gluing. Preferably the housing is made of elastomeric and/or thermoplastic material that is sufficiently elastic to support deformations and forces to which the device is subjected during tyre rolling.

According to that illustrated in FIG. 3, the device is fixed to the radially inner surface 113 of the impermeable elastomeric material layer 112, preferably in proximity to the equatorial plane of the tyre, therefore requiring that the crown portion lack treatment with the second substantially non-cross-linkable polysiloxane composition B. Nevertheless, other placements of the monitoring device are possible, and consequently other portions of the radially inner surface 113 of the impermeable elastomeric material layer 112 will have to be left free of treatment ahead of time, i.e. not hit directly or by means of transfer of said second polysiloxane composition B from the expandable chamber.

Figure 4:
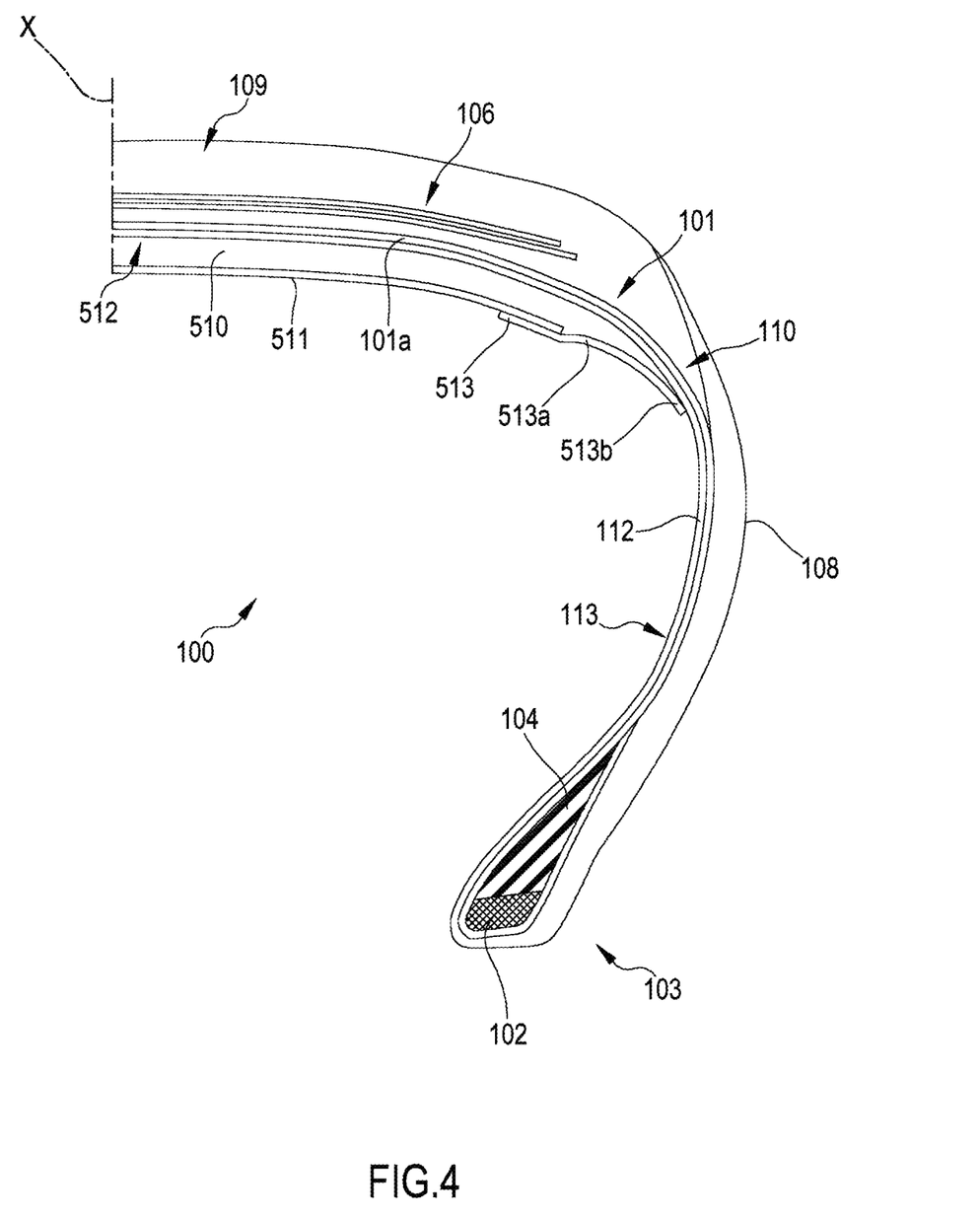

With reference to FIG. 4, a self-sealing tyre 100 is shown in radial half-section that comprises, as third auxiliary component embodiment, a sealing complex 512 comprising a layer of sealing polymer material 510 arranged at the crown portion of the tyre 100, preferably axially extended up to the edges 110, in radially inner position with respect to the liner 112. The layer of sealing polymer material 510 is extended over the entire circumferential extension of the tyre 100.

In radially inner position with respect to the layer of sealing polymer material 510 and in direct contact with said layer of sealing polymer material 510, a self-supporting elastomeric film 511 made of thermoplastic or elastomeric-thermoplastic polymer is arranged.

The tyre 100 also preferably comprises two elongated elements made of elastomeric material 513, each arranged at a circumferential edge of the sealing complex 12. An axially inner portion 513a of each elongated element made of elastomeric material 513 is preferably superimposed on the sealing complex 512 and is arranged in radially inner position with respect to said sealing complex 512.

An axially outer portion 513b of each elongated element made of elastomeric material 513 lies in direct contact with the radially inner surface 113 of the impermeable elastomeric material layer 112. By axially inner portion 513a, it is intended a portion closer to an equatorial plane "X" of the tyre 100 with respect to the axially outer portion 513b.

The sealing complex can be at least partially applied after vulcanisation and is made integral with the radially inner surface 113 of the impermeable elastomeric material layer 112 by means of gluing, e.g. by using the sealing polymer material 510 itself and a specific glue for the zones of the elongated elements 513.

If the sealing complex also comprises a protective layer in radially outer position with respect to the sealing material, it is such protective layer (not illustrated) to be glued to the radially inner surface 113 of the impermeable elastomeric material layer 112 together with the elongated elements 513.

The radially inner surface of the impermeable elastomeric material layer at the crown portion and possibly at the edges of the tyre are previously left free of treatment with the second substantially non-cross-linkable polysiloxane composition B.

EXAMPLES

Two expandable vulcanisation chambers 9 were treated with the first substantially cross-linkable polysiloxane composition A Mono-Lube®1100 (ChemTrend Corp.) over 100% of their external surface. Such expandable chambers had a diameter of 540 mm and were obtained via injection moulding and cross-linking of butyl rubber and phenol resins with non-smooth external surface in order to improve the air leakage.

Before covering, the chambers were cleaned of impurities and prepared for the deposition of the first substantially cross-linkable polysiloxane composition A by means of use of a hydrocarbon solvent. The covering was applied by means of a sponge and about 20 g of composition were applied for each covering, obtaining a residual thickness, after the removal of the volatile phase and after cross-linking, of about 7 micrometres for each covering.

After each covering, the expandable chamber was left at ambient temperature for about 30 minutes, then placed in the oven at 160° C. for 1 h in order to obtain the cross-linking of the polysiloxane film and cooled at ambient temperature (about 25° C.), leaving it under ambient air for 6 hours. The treatment of covering on the first expandable chamber (comparison chamber) was carried out once (application of only one layer). On the second expandable chamber (chamber according to the invention), the treatment of covering was carried out three successive times.

The chambers were mounted on a vulcaniser of "standing post" type, for producing tyres of 215/50 R17 size having as radially inner surface of the impermeable elastomeric material layer a bromobutyl compound and a bead filler compound rich with sulfur (1.2% sulfur in the compound).

One green tyre every six tyres was treated on the radially inner surface of the impermeable elastomeric material layer, at the beads and at the sidewalls and excluding the crown portion, with the second substantially non-cross-linkable polysiloxane composition B in aqueous solution, Mono-Lube® 8186 (ChemTrend Corp.). Before being vulcanised, the green tyre was left at ambient temperature until there was total evaporation of the water; then, normal vulcanisation of the tyres proceeded.

Number of Cycles

The number of vulcanisation cycles carried out by the second expandable chamber (chamber according to the invention) was greater than 326 cycles, without the chamber having to be replaced and with optimal tyre quality; the tyres were without flaws and without non-uniformities on the radially inner surface of the impermeable elastomeric material layer. The number of total cycles of the comparison expandable chamber, on which only one treatment was applied, was less than 200; the use of the chamber was in fact interrupted when damage of the impermeable elastomeric material layer of the tyres was seen.

Adhesion Force

A strip of sound absorbent sponge constituted by polyurethane with 35-41 $Kg/m^3$ density and 2 cm thickness and having, on one side, a layer of pressure-sensitive modified acrylic adhesive by Nitto of Nitto 5015 T(P) type, was made to adhere on the central part of the radially inner surface of the impermeable elastomeric material layer of a tyre in the zone corresponding to the crown, not treated with the second substantially non-cross-linkable polysiloxane composition B. After at least 1 hour from the application, a strip of 19 cm length and 2 cm width was cut from the central zone of the tyre; on such strip, the sponge was made to adhere for a length of 16 cm or for a surface area of 3200 mm$^2$ while 3 cm were left non-adhered by means of insertion of a film between the sponge and the liner.

A same strip of sponge was made to adhere to the radially inner surface of the impermeable elastomeric material layer of the tyre in the zone comprised between the edge and the corresponding bead, such zone treated with the second polydimethylsiloxane-based polysiloxane composition B in aqueous solution, Mono-Lube® 8186 (ChemTrend Corp.), for a same surface area and applying the same pressure.

Before gluing the sponge strip, the surface of the impermeable elastomeric material layer between the edge and the bead was cleaned with physical chemical treatment (cleaning with solvent and scraping with scraper) in a manner so as to eliminate the second substantially non-cross-linkable polysiloxane composition B from the surface of the impermeable elastomeric material layer and render the same visibly rough.

The complete cleaning time for the impermeable elastomeric material layer was about 25 minutes and the inner surface of the tyre was examined in order to verify the absence of damage of the impermeable elastomeric material layer.

Separation tests were conducted 1 hour after application. The applied forces, measured by means of Instron dynamometer, were substantially equal for the two samples up to the destruction of the component before separation.

It was thus shown that the tyre according to the invention was directly ready for the application of the auxiliary component without any need for further cleaning treatments and without the presence of fouling and/or damage of the attachment surface.

The tyre treated with the second substantially non-cross-linkable polydimethylsiloxane-based polysiloxane composition B in aqueous solution, Mono-Lube® 8186 (ChemTrend Corp.), only at the zone between each edge and respective bead, and not treated in the crown portion, having the layer of sponge adhered to the central part of the radially inner surface of the impermeable elastomeric material layer in the crown portion, was subjected to an indoor fatigue test that consisted of rolling the tyre at constant speed under constant load on a drum for a predetermined number of hours, verifying at constant intervals the integrity of the sound absorbent layer, upon stoppage and dismantling of the tyre. The tyre according to the invention exceeded the predetermined time without showing any separation and/or damage of the sound absorbent layer.

The invention claimed is:

1. A process for producing finished tyres provided with auxiliary components for vehicle wheels, comprising:
    a) repetitively forming, on a forming drum, a plurality of green tyres, wherein each green tyre of the plurality of green tyres comprises a carcass structure comprising at least one carcass layer having opposite lateral edges associated with respective bead structures, a pair of sidewalls laterally applied on opposite sides of said carcass structure, a radially inner surface of a layer of impermeable elastomeric material applied at a radially inner position with respect to said carcass structure, the radially inner surface having a first portion and at least one second portion,
    b) arranging an expandable vulcanisation chamber, the arranging comprising
    b1) covering an external surface of said expandable vulcanisation chamber with a first substantially cross-linkable polysiloxane composition A comprising
        A1) at least one reactive polysiloxane oil having OH groups, and
        A2) at least one cross-linking agent comprising a first and a second cross-linking agent, wherein the first cross-linking agent comprises at least two functional groups capable of reacting with the at least one reactive polysiloxane oil A1), wherein the second cross-linking agent comprises a functional group Si—H, and wherein said first substantially cross-linkable polysiloxane composition A further comprises: at least one solvent, wherein said at least one solvent is a cyclic polysiloxane;
    b2) cross-linking said first substantially cross-linkable polysiloxane composition A on the expandable vulcanisation chamber, wherein the cross-linking occurs via heating at a temperature of at least 120° C.;
    b3) repeating at least once the aforesaid operations b1) and b2) resulting in at least two cross-linked layers on the expandable vulcanisation chamber;
    c) shaping, moulding and vulcanising said green tyres to obtain finished tyres, the shaping, moulding and vulcanising comprising:
    c1) selecting one green tyre of the plurality of green tyres out of every n green tyres, wherein n is an integer number from 5 through 50,
    c2) covering the respective at least one second portion of the radially inner surface of said selected green tyre with a substantially non-cross-linkable polysiloxane composition B comprising B1) at least one non-reactive polysiloxane oil, while leaving the first portion of the radially inner surface of said selected green tyre uncovered, wherein organic substituents bonded to silicon atoms of the at least one non-reactive polysiloxane oil B1) of the substantially non-cross-linkable polysiloxane composition B are selected independently from among linear or branched C1-C6 alkyl, C3-C8 cycloalkyl, linear or branched C2-C8 alkenyl, C6-C10 aryl, C6-C15 alkylarylene and C6-C15 arylalkylene wherein the uncovered first portion of said selected green tyre and the covered at least one second portion of said selected green tyre are not substantially superimposed on the selected green tyre; and
    c3) arranging the at least two cross-linked layers of the vulcanization chamber to face the radially inner surface of the selected green tyre in a manner comprising inflating the vulcanization chamber from a deflated state to an inflated state that prevents a transfer of the substantially non-cross-linkable polysiloxane composition B from the covered at least one second portion of the selected green tyre to the uncovered first portion of the radially inner surface of the selected green tyre;
    d) making an auxiliary component adhere on the uncovered first portion of the radially inner surface of said finished tyres.

2. The process as claimed in claim 1, wherein the operations b1) and b2) are carried out at least three times.

3. The process as claimed in claim 1, wherein after b1), said process comprises:
    b11) removing at least one volatile phase of said first substantially cross-linkable polysiloxane composition A.

4. The process as claimed in claim 1, wherein said first polysiloxane composition A that is substantially cross-linkable comprises:
   A3) at least one non-reactive polysiloxane oil wherein organic substituents bonded to silicon atoms of the at least one non-reactive polysiloxane oil A3) are selected independently from among linear or branched $C_1$-$C_6$ alkyl, $C_3$-$C_8$ cycloalkyl, linear or branched $C_2$-$C_8$ alkenyl, $C_6$-$C_{10}$ aryl, $C_6$-$C_{15}$ alkylarylene and $C_6$-$C_{15}$ arylalkylene.

5. The process as claimed in claim 4, wherein in said first substantially cross-linkable polysiloxane composition A, the weight ratio between the at least one non-reactive oil A3) and the at least one reactive oil A1) is less than 1.

6. The process as claimed in claim 1, wherein said first substantially cross-linkable polysiloxane composition A comprises:
   A4) a cross-linking catalyst.

7. The process as claimed in claim 1, wherein the at least one cross-linking agent A2) comprises at least two different cross-linking agents.

8. The process as claimed in claim 7, wherein said at least two different cross-linking agents A2) comprise methyltriethoxysilane.

9. The process as claimed in claim 4, wherein the molecular weight of the at least one reactive polysiloxane oil A1) and/or of the at least one non-reactive polysiloxane oil A3) is greater than 590 Dalton.

10. The process as claimed in claim 1, wherein said first substantially cross-linkable polysiloxane composition A and/or said substantially non-cross-linkable polysiloxane composition B are applied by means of a sponge, by spraying or spreading.

11. The process as claimed in claim 1, wherein the cross-linking of said first substantially cross-linkable polysiloxane composition A on the expandable vulcanization chamber occurs for a time comprised between 30 minutes and 2 hours.

12. The process as claimed in claim 1, wherein c2) comprises covering zones of the at least one second portion situated at the beads of the radially inner surface of the layer of impermeable elastomeric material of said selected green tyre of c1), with said substantially non-cross-linkable polysiloxane composition B.

13. The process as claimed in claim 12, wherein c2) also comprises covering zones of the at least one second portion situated at the sidewalls of said selected green tyre of c1).

14. The process as claimed in claim 1, wherein the at least one non-reactive polysiloxane oil B1) is present in a quantity greater than 10% by weight with respect to the substantially non-cross-linkable polysiloxane composition B.

15. The process as claimed in claim 1, wherein the molecular weight of the at least one non-reactive polysiloxane oil B1 is greater than 590 Dalton.

16. The process as claimed in claim 1, wherein in d) the auxiliary component is a sound absorbent foam for reducing a transmission of noise of said finished tyres and/or a monitoring device and/or a sealing complex.

17. The process as claimed in claim 1, wherein the cross-linking b2) occurs via heating at a temperature between 150° C. and 170° C.

18. The process as claimed in claim 1, wherein the at a first cross-linking agent is selected from the group consisting of organotrialkoxysilane, an organotriacyloxysilane, an organotrioxymosilane and a tetraalkyl silicate.

19. The process as claimed in claim 1, wherein n is 24.

20. The process as claimed in claim 1, wherein n is 12.

21. The process as claimed in claim 1, wherein n is 6.

22. The process as claimed in claim 1, wherein the first portion of the radially inner surface of said selected green tyre is a crown portion of the selected green tyre.

23. The process as claimed in claim 1, wherein the substantially non-cross-linkable polysiloxane composition B comprises polydimethylsiloxane in water.

24. The process as claimed in claim 1, wherein the organic substituents bonded to silicon atoms of the at least one non-reactive polysiloxane oil B1) are selected independently from the group consisting of linear or branched alkyl C1-C6, C6-C15 alkylarylene and C6-C15 arylalkylene.

\* \* \* \* \*